(12) United States Patent
Gartseev et al.

(10) Patent No.: US 10,028,037 B2
(45) Date of Patent: Jul. 17, 2018

(54) APPARATUS, METHOD AND COMPUTER PROGRAM FOR ENABLING INFORMATION TO BE PROVIDED TO A USER

(71) Applicant: HERE Global B.V., Eindhoven (NL)

(72) Inventors: Ilya Gartseev, Moscow (RU); Ilia Safonov, Moscow (RU); Mikhail Pikhletsky, Moscow (RU)

(73) Assignee: HERE Global B.V., Eindhoven (NL)

( * ) Notice: Subject to any disclaimer, the term of this patent is extended or adjusted under 35 U.S.C. 154(b) by 238 days.

(21) Appl. No.: 14/842,187

(22) Filed: Sep. 1, 2015

(65) Prior Publication Data

US 2016/0205450 A1 Jul. 14, 2016

(30) Foreign Application Priority Data

Sep. 9, 2014 (RU) .................... 2014136451

(51) Int. Cl.
*G08B 19/00* (2006.01)
*H04Q 9/00* (2006.01)

(52) U.S. Cl.
CPC ........... *H04Q 9/00* (2013.01); *H04Q 2209/40* (2013.01)

(58) Field of Classification Search
CPC ............................ H04Q 9/00; H04Q 2209/40
See application file for complete search history.

(56) References Cited

U.S. PATENT DOCUMENTS

| | | | |
|---|---|---|---|
| 8,502,693 B2 | 8/2013 | Shum et al. | |
| 8,644,165 B2 | 2/2014 | Saarimaki et al. | |
| 8,655,004 B2 | 2/2014 | Prest et al. | |
| 2004/0102931 A1 | 5/2004 | Ellis et al. | |
| 2006/0277474 A1 | 12/2006 | Robarts et al. | |
| 2009/0083768 A1 | 3/2009 | Hatalkar et al. | |
| 2010/0217862 A1 | 8/2010 | Abbott et al. | |
| 2012/0203491 A1 | 8/2012 | Sun et al. | |
| 2012/0283855 A1 | 11/2012 | Hoffman et al. | |
| 2013/0173526 A1 | 7/2013 | Chun et al. | |
| 2013/0184843 A1 | 7/2013 | Ellis et al. | |
| 2013/0191741 A1 | 7/2013 | Dickinson et al. | |
| 2013/0290879 A1 | 10/2013 | Grisson et al. | |

(Continued)

FOREIGN PATENT DOCUMENTS

| | | |
|---|---|---|
| RU | 2394386 C2 | 1/2010 |
| WO | WO 2008/046443 A1 | 4/2008 |

OTHER PUBLICATIONS

Office Action for Russian Patent Application No. 2014136451/08 dated Oct. 14, 2015.

(Continued)

*Primary Examiner* — Ryan Sherwin
(74) *Attorney, Agent, or Firm* — Alston & Bird LLP

(57) ABSTRACT

An apparatus, method and computer program wherein the apparatus comprises: processing circuitry; and memory circuitry including computer program code; the memory circuitry and the computer program code configured to, with the processing circuitry, cause the apparatus at least to perform; obtaining information from a plurality of sensor devices wherein a first type of information is obtained in notifications and a second type of information is obtained in messages; using information obtained in notifications to select which information obtained in messages is to be provided to a user; and enabling the selected information obtained in messages to be provided to a user.

19 Claims, 10 Drawing Sheets

(56) References Cited

U.S. PATENT DOCUMENTS

2013/0316744 A1 11/2013 Newham et al.
2014/0164611 A1 6/2014 Molettiere et al.

OTHER PUBLICATIONS

Eronen et al., "Audio-Based Context Recognition", IEEE Transactions on Audio, Speech, and Language Processing, vol. 14, No. 1, Jan. 2006, pp. 321-329.
Lu et al., "The Jigsaw Continuous Sensing Engine for Mobile Phone Applications", Proceedings of the 8th ACM Conference on Embedded Networked Sensor Systems, Nov. 3-5, 2010, pp. 71-84.
Mitra et al., "Gesture Recognition: A Survey", IEEE Transactions on Systems, Man, and Cybernetics, Part C: Applications and Reviews, vol. 37, No. 3, May 2007, pp. 311-324.
"Multi-Sensor Context Awareness for Ubiquitous and Wearable Computing", Perceptual Computing Computer Visison, Retrieved on Sep. 9, 2015, Webpage available at : https://www.google.co.in/url?sa=t&rct=j&q=&esrc=s&source=web&cd=1
&ved=0CBsQFJAA&url=http%3A%2F%2Fhci.rwth-aachen.
de%2Ftiki-download_file.php%3FfileId%3D537
&ei=orWnU4eaLcuGuASQwYHgAQ
&usg=AFQjCNFMQPZzitxR_0OgQaEPy-JeNJQ-Gw
&sig2=fE3d9QAt2Y6UnJIAQBThjA&bvm=bv.69411363,d.c2E
&cad=rja.
Kern et al., "Context-Aware Multi-Modal Notification for Wearable Computing", Perceptual Computing and Computer Vision, Sep. 2013, pp. 1-4.

APPARATUS, METHOD AND COMPUTER PROGRAM FOR ENABLING INFORMATION TO BE PROVIDED TO A USER

TECHNOLOGICAL FIELD

Examples of the present disclosure relate to an apparatus, method and computer program for enabling information to be provided to a user. In particular, they relate to an apparatus, method and computer program for enabling information obtained from sensor devices to be provided to a user.

BACKGROUND

Sensor devices which may be wearable and/or portable are known. It may be possible for a user to use a plurality of wearable and/or portable sensor devices simultaneously. For example a user may use smart watches, heart rate monitors, fitness trackers, activity trackers, glasses or other suitable devices. Such devices may be able to obtain a large quantity of information. It is useful to be able to provide the information to a user in a manner which is easily digested by a user.

BRIEF SUMMARY

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform; obtaining information from a plurality of sensor devices wherein a first type of information is obtained in notifications and a second type of information is obtained in messages; using information obtained in notifications to select which information obtained in messages is to be provided to a user; and enabling the selected information obtained in messages to be provided to a user.

In some examples the selected information may be provided to a headset to provide an audible output.

In some examples the information obtained in notifications may be used to filter the information obtained in messages.

In some examples the information obtained in notifications may be used in an adaptive ranking algorithm of the information obtained in messages.

In some examples the information obtained in notifications may comprise information indicative of at least one of, a context of a user, an activity of a user, a gesture of a user.

In some examples the information obtained in messages may comprise information indicative of at least one of a physiological parameter, an environmental parameter, a location, movement of a sensor device.

In some examples the selected information may be provided to a user while they are performing an activity.

In some examples the selected information may be provided to a user in real time.

In some examples the plurality of sensor devices may comprise at least one wearable sensor device.

In some examples the information may be obtained via short range communication links.

In some examples the apparatus may be configured to generate a request to a user to enable a user to confirm information.

According to various, but not necessarily all, examples of the disclosure there may be provided a mobile communications device comprising an apparatus as described above.

According to various, but not necessarily all, examples of the disclosure there may be provided a system comprising a plurality of wearable sensor devices and at least one apparatus as described above.

According to various, but not necessarily all, examples of the disclosure there may be provided a method comprising: obtaining information from a plurality of sensor devices wherein a first type of information is obtained in notifications and a second type of information is obtained in messages; using information obtained in notifications to select which information obtained in messages is to be provided to a user; and enabling the selected information obtained in messages to be provided to a user.

In some examples the selected information may be provided to a headset to provide an audible output.

In some examples the information obtained in notifications may be used to filter the information in the messages.

In some examples the information obtained in notifications may be used in an adaptive ranking algorithm of the information obtained in messages.

In some examples the information obtained in notifications may comprise information indicative of at least one of, a context of a user, an activity of a user, a gesture of a user.

In some examples the information obtained in messages may comprise information indicative of at least one of a physiological parameter, an environmental parameter, a location, movement of a sensor device.

In some examples the selected information may be provided to a user while they are performing an activity.

In some examples the selected information may be provided to a user in real time.

In some examples the plurality of sensor devices may comprise at least one wearable sensor device.

In some examples the information may be obtained via short range communication links.

In some examples the method may further comprise generating a request to a user to enable a user to confirm information.

According to various, but not necessarily all, examples of the disclosure there may be provided a computer program comprising computer program instructions that, when executed by processing circuitry, enable: obtaining information from a plurality of sensor devices wherein a first type of information is obtained in notifications and a second type of information is obtained in messages; using information obtained in notifications to select which information obtained in messages is to be provided to a user; and enabling the selected information obtained in messages to be provided to a user.

According to various, but not necessarily all, examples of the disclosure there may be provided a computer program comprising program instructions for causing a computer to perform the method as described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Figure 1:
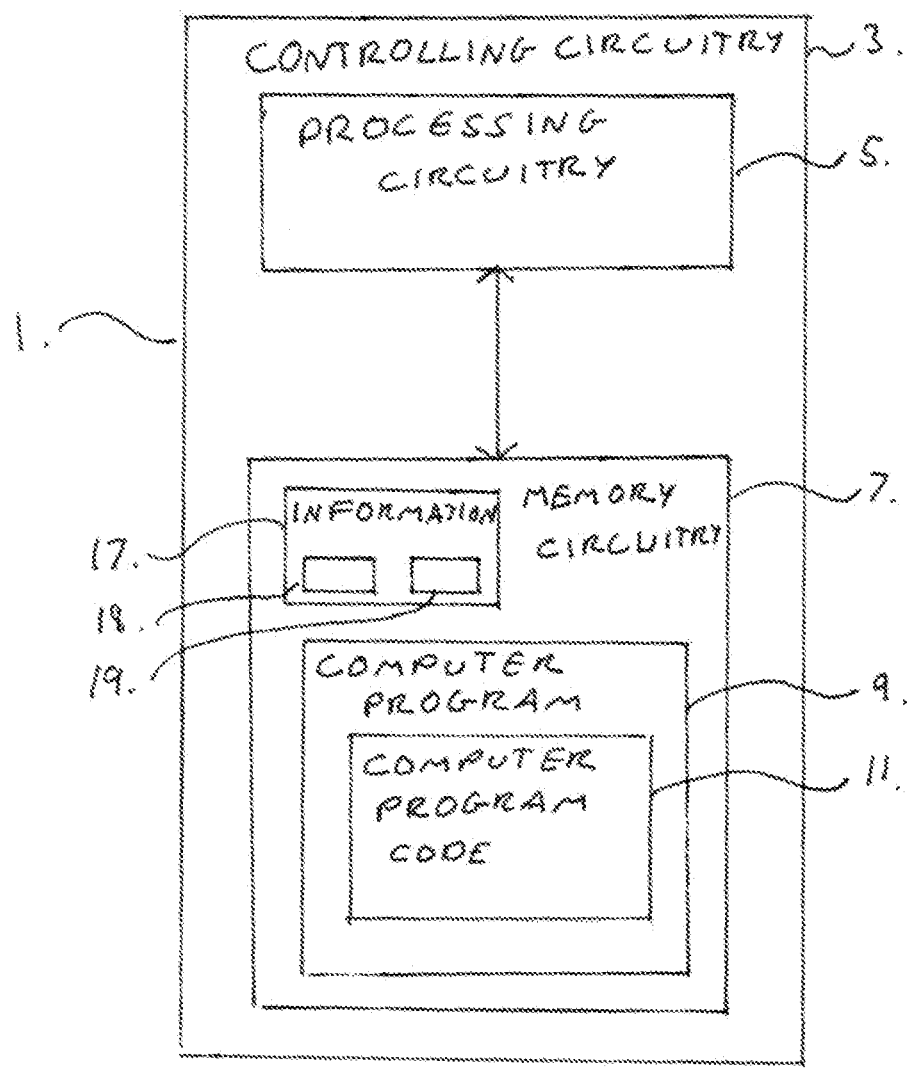
FIG. 1 illustrates an apparatus.

The Figures illustrate an apparatus 1 comprising: processing circuitry 5; and memory circuitry 7 including computer program code 11; the memory circuitry 7 and the computer program code 11 configured to, with the processing circuitry 5, cause the apparatus 1 at least to perform; obtaining information 17 from a plurality of sensor devices 33 wherein a first type of information is obtained in notifications 18 and a second type of information is obtained in messages 19; using information obtained in notifications 18 to select which information obtained in messages 19 is to be provided to a user; and enabling the selected information obtained in messages 19 to be provided to a user.

Examples of the disclosure provide apparatus 1, methods and computer programs for enabling information to be provided to a user. The information may be obtained from sensor devices such as wearable sensor devices. The sensor devices may generate a large amount of information. As information is selected before it is provided to the user this enables only relevant information to be provided to the user.

Figure 2:
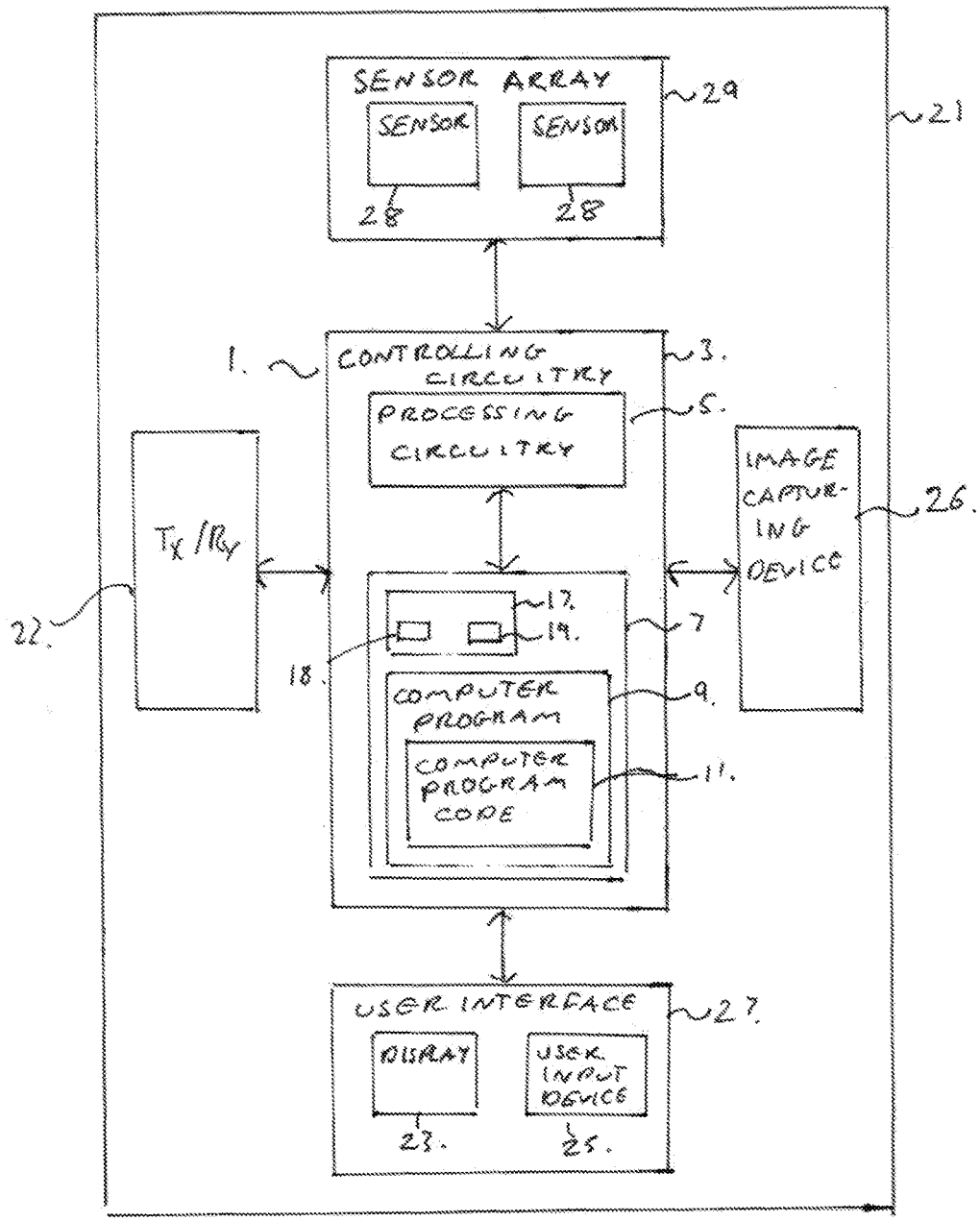
FIG. 2 illustrates an electronic device comprising an apparatus.
Figure 3:
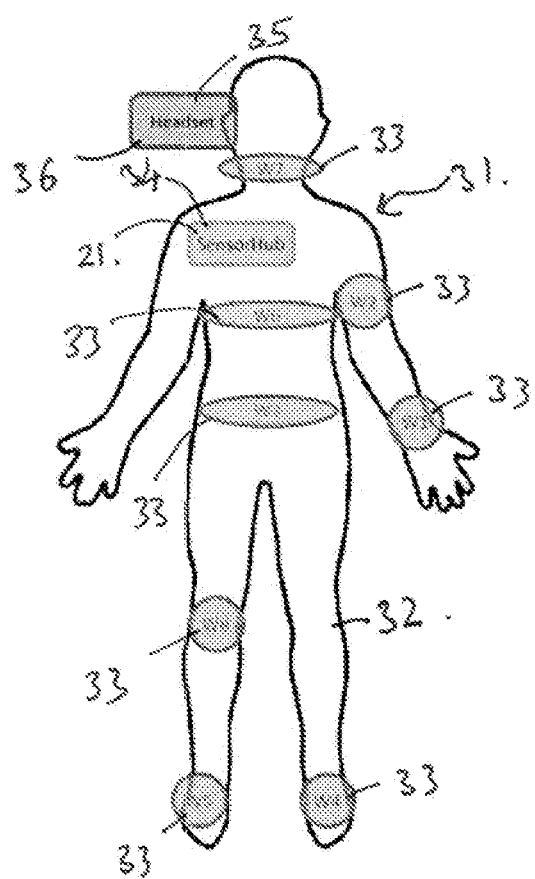
FIG. 3 illustrates an example system.

FIG. 1 schematically illustrates an example apparatus 1 which may be used in implementations of the disclosure. The apparatus 1 illustrated in FIG. 1 may be a chip or a chip-set. The apparatus 1 may be provided within an electronic device 21. An example electronic device 21 is illustrated in FIG. 2. In some examples the apparatus 1 may be provided within an electronic device 21 such as a communications device. The electronic device 21 may be part of a system 31 as illustrated in FIG. 3.

The example apparatus 1 comprises controlling circuitry 3. The controlling circuitry 3 may comprise one or more controllers. The controlling circuitry may comprise means for controlling the apparatus 1. The controlling circuitry 3 may be implemented using instructions that enable hardware functionality, for example, by using executable computer program instructions in a general-purpose or special-purpose processing circuitry 5 that may be stored on a computer readable storage medium (disk, memory etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enables the apparatus 1 to perform the example methods illustrated in FIGS. 5 to 10. The processing circuitry 5 by reading the memory circuitry 7 is able to load and execute the computer program 9.

In the example apparatus 1 of FIG. 1 information 17 may be stored in the memory circuitry 7. The information 17 may comprise information that has been obtained in notifications 18 and information which has been obtained in messages 19. The information obtained in messages 19 may be retrieved from the memory circuitry 7 and provided to a user in some of the examples of the disclosure.

The apparatus 1 therefore comprises: processing circuitry 5; and memory circuitry 7 including computer program code 11; the memory circuitry 7 and the computer program code 11 configured to, with the processing circuitry 5, cause the apparatus 1 at least to perform; obtaining information 17 from a plurality of sensor devices 33 wherein a first type of information is obtained in notifications 18 and a second type of information is obtained in messages 19; using information obtained in notifications 18 to select which information obtained in messages 19 is to be provided to a user; and enabling the selected information obtained in messages 19 to be provided to a user.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 9. The apparatus 1 may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates an example electronic device 21 which may be used in implementations of the disclosure. The electronic device 21 of FIG. 2 comprises controlling circuitry 3, a transceiver 22. The example electronic device 21 also comprises, a user interface 27 an image capturing device 26 and one or more sensors 28. It is to be appreciated that only features necessary for the following description have been illustrated in FIG. 2 and that other examples may comprise additional features. For example a power source may be provided.

The electronic device 21 may comprise any electronic device 21 which may be used to obtain information from a plurality of sensor devices and select which information is to be provided to a user. The electronic device 21 may comprise a portable user device. For example, the electronic device 21 may be a device such as a mobile telephone, a tablet computer, a digital camera, a gaming device or any other suitable device. The electronic device 21 may be a portable electronic device 21 which can be carried in a user's hand or bag. The electronic device 21 may be a hand held device such that it is sized and shaped so that the user can hold the electronic device 21 in their hand while they are using the electronic device 21.

The controlling circuitry 3 of FIG. 2 may be as illustrated in FIG. 1 and described above. Corresponding reference numerals are used for corresponding features.

In the example of FIG. 2 the transceiver 22 has been illustrated as a single component however it is to be appreciated that the transceiver may comprise one or more transmitters and/or receivers. The transceiver 22 may comprise any means which may enable the electronic device 21 to establish a communication connection with a remote device and exchange information with the remote device. The remote device may be a sensor device and the communication connection may enable information which has been detected by one or more sensor devices to be obtained by the electronic device 21. The transceiver 22 may also be configured to establish a communication link with a user output device such as a headset so as to enable selected information to be provided to a user.

The communication connection may comprise a wireless connection. The communication connection may be a short range wireless connection such as Bluetooth™ or other suitable connection. It is to be appreciated that in some examples the communication connection may also comprise a wired connection.

In some examples the transceiver 22 may enable the electronic device 21 to connect to a network. The network may comprise a cellular or non-cellular network. In some examples the transceiver 22 may enable the apparatus 1 to communicate in local area networks such as wireless local area networks, Bluetooth networks or any other suitable network.

In the example of FIG. 2 the user interface 27 may comprise any means which enables a user to interact with the electronic device 21. The user interface 27 may be configured to provide outputs to the user and enable a user to make user inputs. In the example of FIG. 2 the user interface 22 comprises a display 23 and a user input device 25.

The display 23 may comprise any means which may enable information to be displayed to a user. The display 23 may comprise any suitable display such as a liquid crystal display, light emitting diode, organic light emitting diode, thin film transistor or any other suitable type of display.

The user input device 25 may comprise any means which enables a user to input information into the electronic device 21. The information may be used to control the electronic device 21.

In some examples the user input device 25 may comprise a touch pad. The touch pad may be integrated within the display 23 to provide a touch sensitive display. The touch pad may comprise any means which may enable a user to make an input into the electronic device 21 by touching the surface of the touch pad with an object or bringing an object into proximity of the surface of the touch pad. The objects used to make the user input could be any of a user's fingers including their thumbs or an object such as a stylus.

The user interface 27 may comprise other user input devices 25 instead of, or in addition to, the touch pad. For example the electronic device 21 could comprise a keypad, motion sensors, gesture recognition devices, voice recognition devices or a combination of different types of user input devices.

The example electronic device 21 of FIG. 2 also comprises an image capturing device 26. The image capturing device 26 may comprise any means which enables the electronic device 21 to obtain images. The image capturing device 26 may comprise an image sensor which may be configured to convert light incident on the image sensor into an electrical signal to enable an image to be produced. The image sensors may comprise, for example, digital image sensors such as charge-coupled-devices (CCD) or complementary metal-oxide-semiconductors (CMOS). The images which are obtained may provide a representation of a scene and/or objects which are positioned in front of the image capturing device 26. The information obtained from the image capturing device may be used to enable the context or activity or other such information to be determined.

In the example of FIG. 2 only one image capturing device 26 is illustrated. In some examples the electronic device 21 may comprise more than one image capturing device 26. For example the electronic device 21 may comprise a front face camera, a rear face camera, a dual camera that captures 3D images or any combination of such image capturing devices 26.

In the example of FIG. 2 the electronic device 21 also comprises one or more sensors 28 which may be arranged in a sensor array 29. The one or more sensors 28 may comprise any means which may enable a physical parameter to be measured or detected, and enable an output signal indicative of the measured or detected parameter to be provided.

In some examples the sensors 28 may comprise one or more accelerometers which may be able to detect movement of the electronic device. In some examples the sensors 28 may comprise one or more positioning sensors. The positioning sensors may enable the position of the electronic device 21 to be determined. The positioning sensors may comprise GNSS (global navigation satellite systems) sensors such as GPS (Global positioning system) sensors, GLONASS (Globalnaya navigatsionnaya sputnikovaya sistema) sensors or any other suitable types of sensors.

In some examples the sensors 28 may be configured to detect environmental parameters such as a chemical which may be present in the environment around the electronic device or any other physical parameter of the local environment which may be detected such as temperature or light.

It is to be appreciated that the sensors 28 may be configured to detect any suitable parameter.

FIG. 3 illustrates an example system 31. The system 31 comprises an electronic device 21, a plurality of sensor devices 33 and a user output device 35. The electronic device 21 may be as described above with reference to FIG. 2. Corresponding reference numerals are used for corresponding features.

In the example system the electronic device 21 acts as a sensor hub 34. The sensor hub 34 is configured to obtain information from the plurality of sensor devices 33. The sensor hub 34 is configured to obtain information from each of the plurality of sensor devices 33. The sensor hub 34 may then process the information which is received to select which information is to be provided to the user. The sensor hub 34 may use the method described below to select which information is to be provided to the user 32.

As mentioned above the electronic device 21 may be a portable device which may be carried by the user. For example the electronic device 21 may be a communication device such a cellular telephone or a tablet computer. In some examples the electronic device 21 may be worn by the user, for example the electronic device 21 may be a smart watch or other device which may be attached to the body of the user 32.

The electronic device 21 may be separate to the sensor devices 33 so that the sensor devices 33 and the electronic device 21 are not physically connected to each other. The electronic device 21 may be configured to communicate with one or more of the sensor devices 33 via a communications link. The communications link may comprise a wireless communication link such as a Bluetooth link, a low power radio frequency link, a Wi-Fi communication link or any other wireless communication link.

The sensor device 33 may comprise any means which may be configured to enable a physical parameter to be measured or detected, and enable an output signal indicative of the measured or detected parameter to be provided.

In some examples the sensor device 33 may be configured to detect physiological parameters. The physiological parameter may be any parameter which relates to the physiology of the user 33 of the sensor device 33. The physiological parameter may be a parameter which is generated by the user of the sensor device 33. For example the sensor devices 33 may be configured to detect heart rate, movement of a user or part of the user's body, chemicals such as sweat or water which may be generated by a user, a bio electrical signal which may be detected using electromyography (EMG), magnetoencephalography, electroencephalography (EEG) or any other suitable technique or any other suitable parameters.

In some examples one or more of the sensor devices 33 may comprise means for detecting a position or movement of the sensor device 33. In some examples one or more sensor devices 33 may comprise accelerometers which may be able to detect movement of the sensor device 33. In some examples the sensor device 33 may comprise one or more positioning sensors. The positioning sensors may enable the position of the sensor device 33 to be determined. The positioning sensors may comprise GNSS (global navigation satellite systems) sensors such as GPS (Global positioning system) sensors, GLONASS (Globalnaya navigatsionnaya sputnikovaya sistema) sensors or any other suitable types of sensors.

In some examples the sensor devices 33 may be configured to detect environmental parameters such as a chemical which may be present in the environment around the electronic device or any other physical parameter of the local environment which may be detected such as temperature or light.

It is to be appreciated that the sensor devices 33 may be configured to detect any suitable parameter.

In the example illustrated in FIG. 3 each of the plurality of sensor devices 33 is worn by the user. The sensor devices 33 may comprise attachment means which may enable the sensor devices 33 to be secured to the body of the user 32. In some examples the attachment means may comprise a strap which may be attached around a user's arm, leg, torso or other part of the body. In other examples the attachment means may comprise, for example, an adhesive portion which may enable the sensor devices 33 to be adhered to the skin of the user 32. In some examples the apparatus 1 may be part of an item of clothing which may be configured to be worn by the user.

In the example system of FIG. 3, a first sensor device 33 is positioned on the wrist of the user 32. A second sensor device 33 is positioned on an upper arm of the user 32. A third sensor device 33 is positioned around the waist of the user 32. Two sensor devices 33 are attached to the feet of the user 32. A sixth sensor device 33 is attached to the chest of the user 32. A seventh sensor device 33 is attached to the head of the user and an eighth sensor device 33 is attached to a knee of the user 32. It is to be appreciated that a different number of sensor devices 33 could be used in other systems 31 and that the sensor devices 33 may be attached to other parts of the body of the user 32.

In some examples the system 31 may also comprise sensor devices 33 which are not attached to the user. For example the sensor devices 33 which are attached to the feet of the user could be attached to the shoe of the user 32 instead. In some examples the sensor devices 33 may be attached to a piece of equipment that the user is using, for example a power meter, cadence sensor or positioning device could be attached to a bicycle that a user 32 is riding.

In some examples the sensor devices 33 may comprise controlling circuitry 3. The controlling circuitry 3 may be as described above in relation to FIG. 1. The controlling circuitry 3 may comprise memory circuitry 7 which may be configured to store information obtained by the sensor devices 33. The controlling circuitry 3 may also comprise processing circuitry 5 which may be configured to process some or all of the information obtained by the sensors.

The sensor devices 33 may also comprise a transceiver which may enable the sensor devices 33 to establish communication connections with the electronic device 21. The communication connection may enable information which has been detected by one or more sensor devices 31 to be obtained by the electronic device 21. The communication connection may comprise a wireless connection. The communication connection may be a short range wireless connection such as Bluetooth™ or other suitable connection. It is to be appreciated that in some examples the communication connection may also comprise a wired connection.

The example system of FIG. 3 also comprises at least one user output device 35. The user output device 35 may comprise any device which comprises means for providing an output to a user 32. In the example of FIG. 3 the user output device 35 comprises a headset 36. It is to be appreciated that other user output devices 35 may be used in other examples of the disclosure such as a loudspeaker, a head mounted display, earphones, a television, a stereo system, a watch or any other suitable device.

The user output device 35 may be wearable by the user, for example the user output device 35 may comprise a mounting portion which enables the user output device 35 to be attached to the user. For example a headset 36 may comprise means for attaching the headset to the head of the user 32.

The headset 36 may comprise means for providing an audio output. For example, the headset 36 may comprise a loudspeaker or an earpiece. The user headset 36 may be worn by a user so that the loudspeaker may be positioned adjacent to the user's ears. In other examples the headset may comprise other output devices such as near eye displays.

In some examples the headset 36 may comprise controlling circuitry 3. The controlling circuitry 3 may be as described above in relation to FIG. 1. The controlling circuitry 3 may comprise memory circuitry 7 which may be configured to store information obtained from the electronic device 21.

The headset 36 may also comprise a transceiver which may enable the headset 36 to establish a communication connection with the electronic device 21. The communication connection may enable information which has been obtained by the electronic device 21 to be transmitted to the headset 36. This may enable the information which has been obtained by the electronic device 21 to be provided to a user 32. The communication connection may comprise a wireless connection. The communication connection may be a short range wireless connection such as Bluetooth™ or other suitable connection. It is to be appreciated that in some examples the communication connection may also comprise a wired connection.

In the example of FIG. 3 the electronic device and the user output device 35 are provided as separate devices. It is to be appreciated that in other examples these may be combined into a single device.

Figure 4:
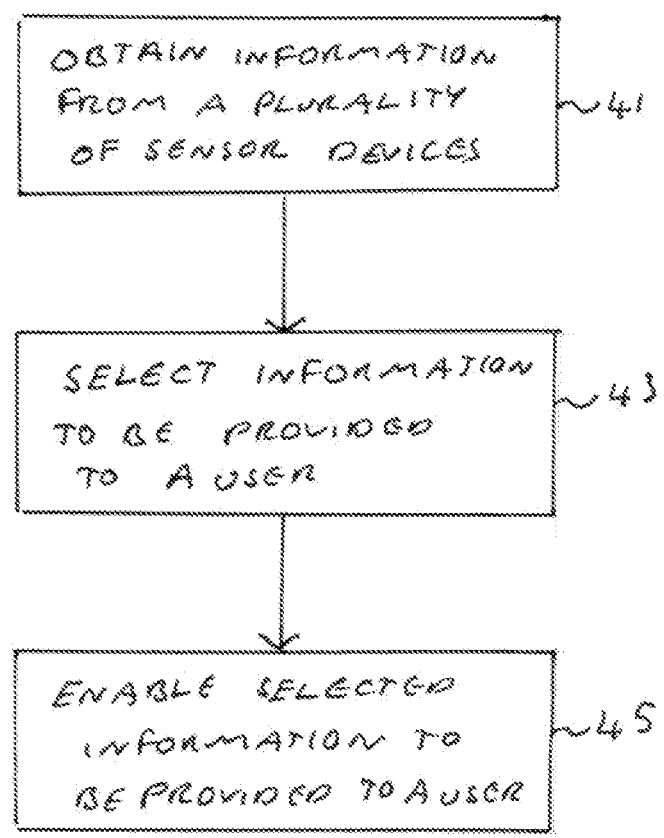
FIG. 4 illustrates a method.

FIG. 4 illustrates a method. The method may be implemented by an apparatus 1 as described above. The apparatus 1 may be provided within an electronic device 21 as described above.

The method comprises, at block 41 obtaining information 17 from a plurality of sensor devices 33 wherein a first type of information is obtained in notifications 18 and a second type of information is obtained in messages 19. The method also comprises, at block 43, using information obtained in notifications 18 to select which information obtained in messages 19 is to be provided to a user 32, and at block 45 enabling the selected information obtained in messages 19 to be provided to a user 32.

Figure 5:
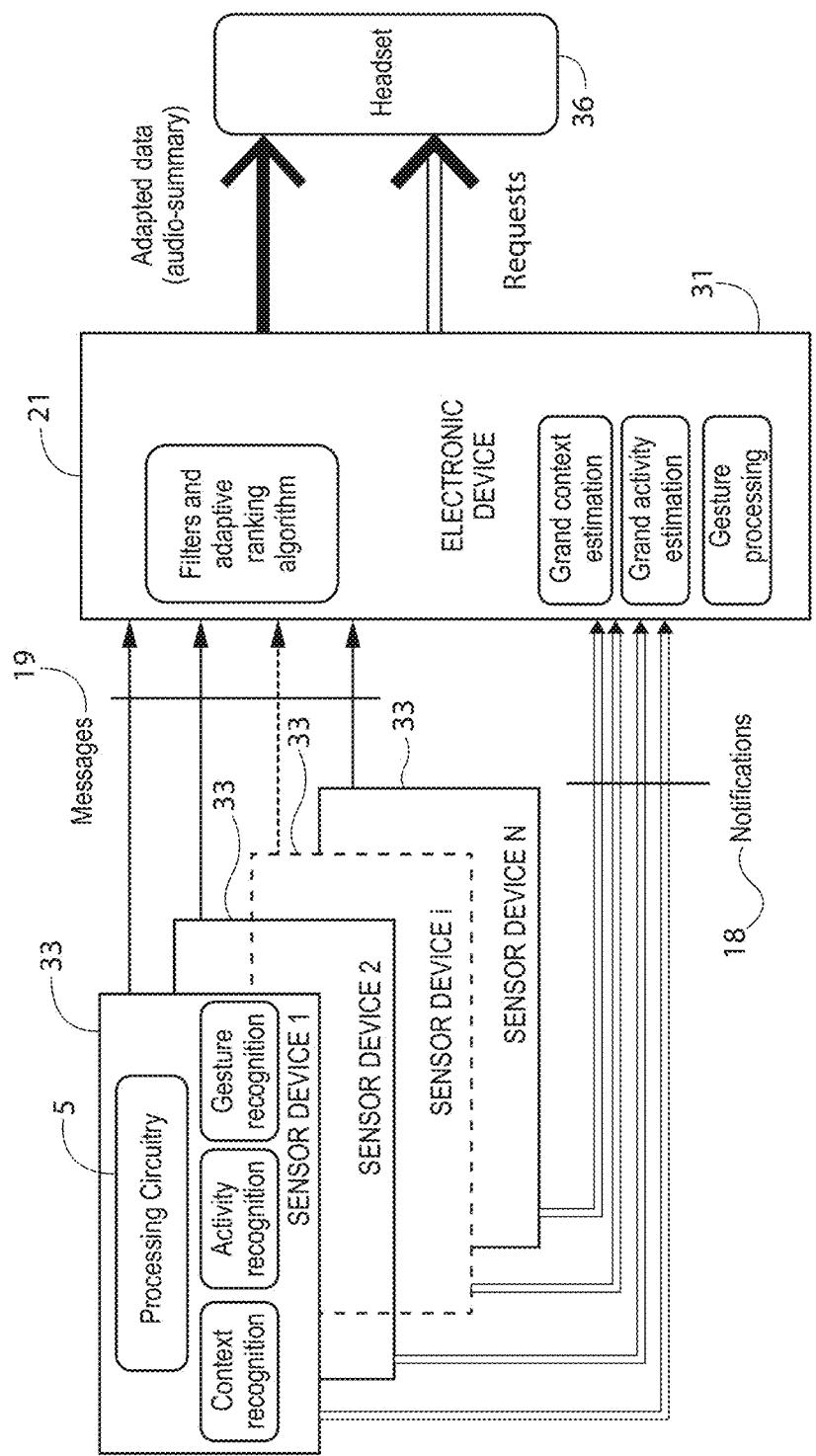
FIG. 5 illustrates a structure and signals diagram for a system.

FIG. 5 illustrates a structure and signals diagram for a system 31. The system 3 may be as illustrated in FIG. 3 and described above. The system 31 comprises N sensor devices 33 where N is any positive integer, an electronic device 21 and a headset 36. The sensor devices 33 may comprise one or more wearable devices.

The sensor devices 33 may be configured to obtain information. The information may relate to parameters which are detected by and/or measure by the sensor devices 33. The information which is obtained may comprise a first type of information and a second type of information. The first type of information may be provided to the electronic device 21 in notifications 18. The second type of information may be provided to the electronic device 21 in messages 19. The messages 19 and notifications 18 may be structured so that they are identifiable as either a message 19 or a notification 18. For example a first data structure may be used for messages 19 while a second data structure may be used for notifications 18.

The information which is provided in messages 19 may comprise information which may be provided to the user via the headset 36 or other output device 35. The information which is provided in messages 19 may comprise information which is useful for the user to know. The information which is provided in the messages 19 may relate directly to parameters which the user 32 may be monitoring. The information obtained in messages 19 may comprise information indicative of at least one of a physiological parameter, an environmental parameter, a location, movement of a sensor or any other suitable information.

The information which is provided in messages 19 may comprise information which relates to the main functionality of the sensor devices. For example a heart rate monitor may provide messages containing information relating to a user's heart rate, a thermometer may provide information relating to the body temperature of a user or a pedometer may provide information relating to distance traveled by a user, or the number of steps taken or the number of calories burned. In some examples the information which is obtained in the messages may not need to be formatted or processed before the information is provided to a user.

The information which is provided in notifications 18 may comprise information which may be used by the electronic device 21 to select which of the information obtained in messages 19 is to be provided to a user. The information which is provided in notifications 18 may relate indirectly to parameters which the user 32 may be monitoring. The information obtained in notifications 18 may comprise information indicative of at least one of, a context of a user 32, an activity of a user 32, a gesture of a user 32 or any other suitable information.

The information which is provided in notifications 18 may be processed by processing circuitry 5 before it is provided in the notifications 18. The information may be obtained by one or more sensors and then processed by a processing circuitry to provide an indication of a current action by a user 32. The current action of a user could be a context, an activity or a gesture or any other suitable action. The context may comprise the location of the user or any other environmental information. Examples of possible contexts for a user 32 comprise a workplace, gym, pub, theater, house, car, park, public transport or any other suitable context. The activity information may comprise information relating to what the user 32 is currently doing. Examples of possible activities for a user 32 comprise walking, running, sitting, staying, laying or any other suitable activity. The gesture information may comprise information relating to whether or not the user has made a specific input or motion. For example a gesture could be nodding of a head, stamping of a foot, waving a hand or any other suitable gesture.

It is to be appreciated that each sensor device 33 may provide only a part of the above described information. For example a first sensor device 33 may be arranged to provide information relating to gestures only while a second sensor device 33 may be configured to provide information relating to temperature only.

The electronic device 21 may be configured to use the information which is obtained in the notifications 18 to select which of the information which is obtained in the messages 19 is to be provided to the user 32. The electronic device 21 may be configured to use the information obtained in the notifications 18 to determine the context or activity or gesture of a user. This may then be used to filter out information which is unnecessary to the user for the given context or activity that they have. An example of how the electronic device 21 uses the notification information 18 is described in more detail below with reference to FIG. 9.

The electronic device 21 may also be configured to use the information obtained in the notifications in an adaptive ranking algorithm to determine which of the received messages 18 is likely to be important to the user. This information from the messages 18 may then be provided to the user via the headset 36. The information may be provided to a user an as audible output. An example of how the electronic device 21 uses the adaptive ranking algorithm is described in more detail below with reference to FIG. 8.

The electronic device 21 may be configured to provide the information to the user 32 in real time. The processing circuitry 5 of the electronic device 21 may be configured to process the obtained information in real time so that the user 32 senses the information as immediate or keeping up with the activity that they are carrying out. The information may be provided to the user while they are carrying out an activity.

In the example of FIG. 5 the electronic device 21 is configured to generate requests which may also be provided to the user 32 as an output via the headset 36. The request may enable a user to confirm information with the electronic device 21. For example the request may enable a user to make a gesture in response to the request to indicate whether or not the electronic device 21 has identified the correct context or activity.

The requests and gestures may also be used to enable a user to indicate the frequency at which they would like information to be provided, the amount of information which they would like to receive from each of the sensor devices 33 or any other suitable information. The responses and gestures which are detected may be used to update the adaptive ranking algorithm. This may enable the user to control the information which is provided to them, which enables a personalized information service to be created.

As an example the system 31 may be being used by a user 32. The user 32 may go to a gym and starts running on a treadmill. One or more sensor devices 33 may be used to detect a new context of the user 32 as being at the gym. The sensor devices 33 which may be used to identify that the user is at the gym may comprise positioning devices such as GPS devices, audio devices such as microphones or any other suitable devices which may detect any suitable information. The sensor devices 33 may send a notification 18 to the electronic devices 21 indicative of the detected new context.

One or more sensor devices 33 may be used to detect a new activity of the user 32. In this example the new activity is running. The sensor devices 33 which may be used to identify that the user is running may comprise motion detectors such as accelerometers, heart rate monitors or any other suitable sensor devices 33. The sensor devices 33 may send a notification 18 to the electronic devices 21 indicative of the detected new context.

The sensor devices 33 may detect the new activity simultaneously to detecting the new context. In some examples one or more of the same sensor devices 33 may be configured to provide information indicative of the new context and the new activity. In some examples different sensor devices 33 may be used provide information about the new activity and context.

The electronic device 21 uses the information to select which messages 19 should be provided to the user. The electronic device 21 can filter messages which do not relate to the current context and activity. For example, the user 32 may want to switch off messages relating to received telephone calls or emails. The electronic devices 21 can also assign a higher priority to messages 19 which relate to current context and activity. Messages 19 with a higher priority may be provided more frequently or before messages 19 with a lower priority. Messages 19 which may be related to the activity of running could be calories, hear rate and distance ran or any other suitable information.

The sensor devices 33 may also be configured to detect gestures which a user may make to change the frequency at which they are receiving messages. For example if it is detected that a user 32 has made an input immediately after receiving a message 18 relating to a first parameter then this may be interpreted as the user 32 indicating that they would like to change the frequency at which they are receiving such messages. For example the user 32 may wish to turn off or decrease the frequency at which they receive messages about heart rate but may wish to increase the frequency at which they receive information about distance ran. In such circumstances the gesture could be a wave of the arm in a particular direction or any other suitable gesture.

In some examples the electronic device 21 may not be able to accurately determine the context or activity of the user. In such examples a request may be generated to enable a user to confirm their context and/or activity. For example the electronic device 21 may enable the headset 36 to provide a query to the user. The user may be able to confirm or specify their current context or activity.

Figure 6:
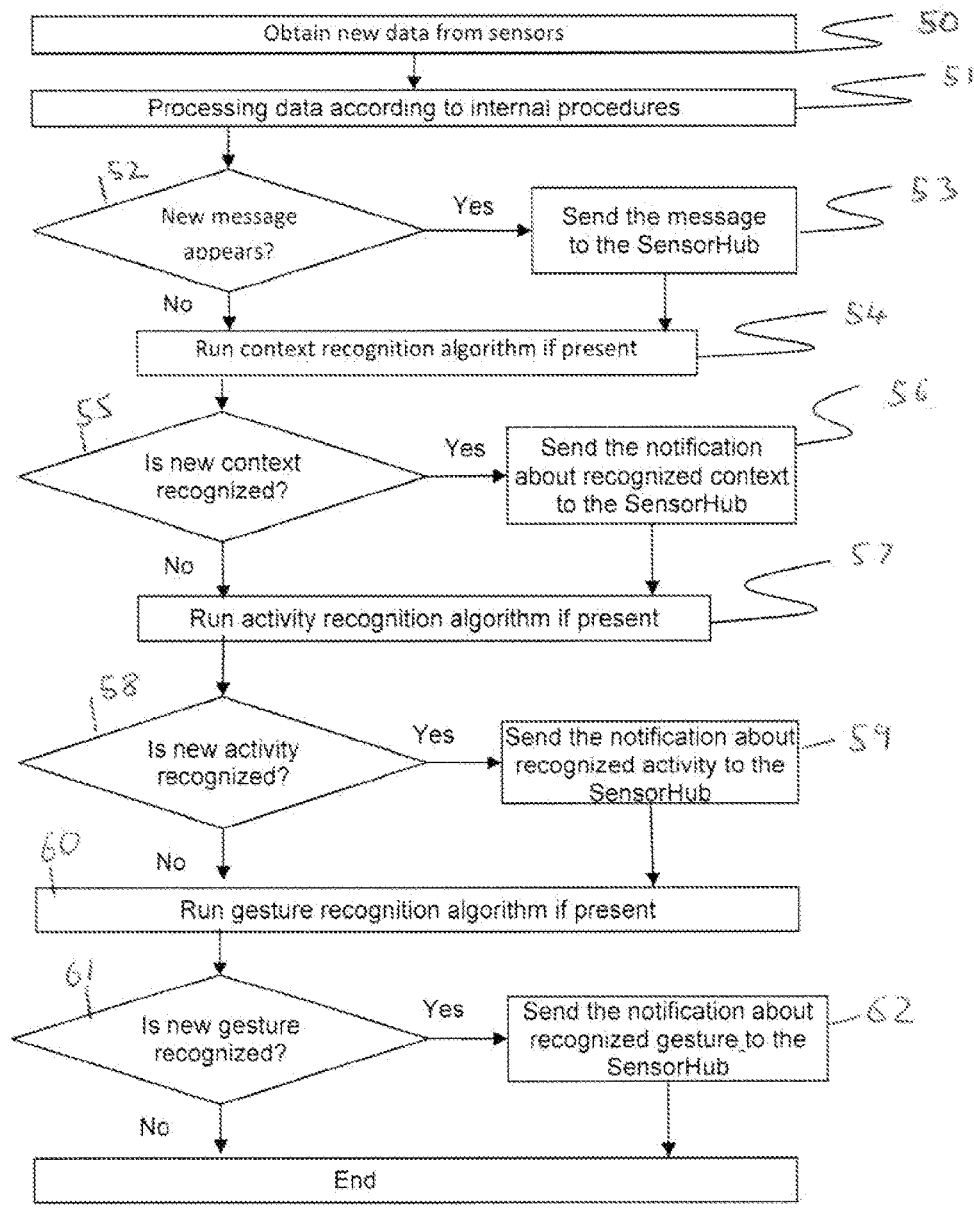
FIG. 6 illustrates a method.

FIG. 6 illustrates an example method. The method may be performed by a sensor device 33 as described above. The method may be performed by any of the sensor devices 33 in the system 31.

At block 50 a new portion of data from sensors in the sensor device 33 is obtained by the controlling circuitry 3 of the sensor device 33. The data may be any suitable type of data.

At block 51 the data is processed by the controlling circuitry 3. The processing of the data may convert the data obtained from the sensor into information which may be digested by a user or information which may be used to identify a context, activity or gesture.

For example, at block 51 a heart rate monitor may convert data received from an ECG or other type of sensor into a heart rate. Similarly at block 51 a pedometer may convert data from the sensor into information about the number of steps made, the distance traveled and the calories burned.

Following on from the processing at block 51 one or more new messages 19 may be generated at block 52. If a new message 19 is generated then, at block 53 the new message 19 may be provided to the electronic device 21 which may be acting as a sensor hub 34. The sensor hub 34 may be obtaining information from a plurality of sensor devices 33. The message 19 may be transmitted using a wireless communication connection as described above.

At block 54, the controlling circuitry 3 may run a context recognition algorithm. The context recognition algorithm may be configured to detect, at block 55, whether or not a new context has been detected. If a new context has been detected then, at block 56, a notification 18 may be sent to the electronic device 21 indicating that a new context has been detected.

In some examples of the disclosure only some of the sensor devices 33 might be configured to run the context detection algorithm. In such examples only some of the sensor devices 33 might provide the notifications 18 to the electronic device 21. In such examples, where the sensor device 33 does not run the context detection algorithm, blocks 54 to 56 may be omitted.

At block 57, the controlling circuitry 3 may run an activity recognition algorithm. The activity recognition algorithm may be configured to detect, at block 58, whether or not a new activity has been detected. If a new activity has been detected then, at block 59, a notification 18 may be sent to the electronic device 21 indicating that a new activity has been detected.

In some examples of the disclosure only some of the sensor devices 33 might be configured to run the activity detection algorithm. In such examples only some of the sensor devices 33 might provide the notifications 18 to the electronic device 21. In such examples, where the sensor device 33 does not run the activity detection algorithm, blocks 57 to 59 may be omitted.

At block 60, the controlling circuitry 3 may run a gesture recognition algorithm. The gesture recognition algorithm may be configured to detect, at block 61, whether or not a new gesture has been detected. If a new gesture has been detected then, at block 562, a notification 18 may be sent to the electronic device 21 indicating that a new gesture has been detected.

In some examples of the disclosure only some of the sensor devices 33 might be configured to run the gesture detection algorithm. In such examples only some of the sensor devices 33 might provide the notifications 18 to the electronic device 21. In such examples, where the sensor device 33 does not run the gesture detection algorithm, blocks 60 to 62 may be omitted.

Figure 7:
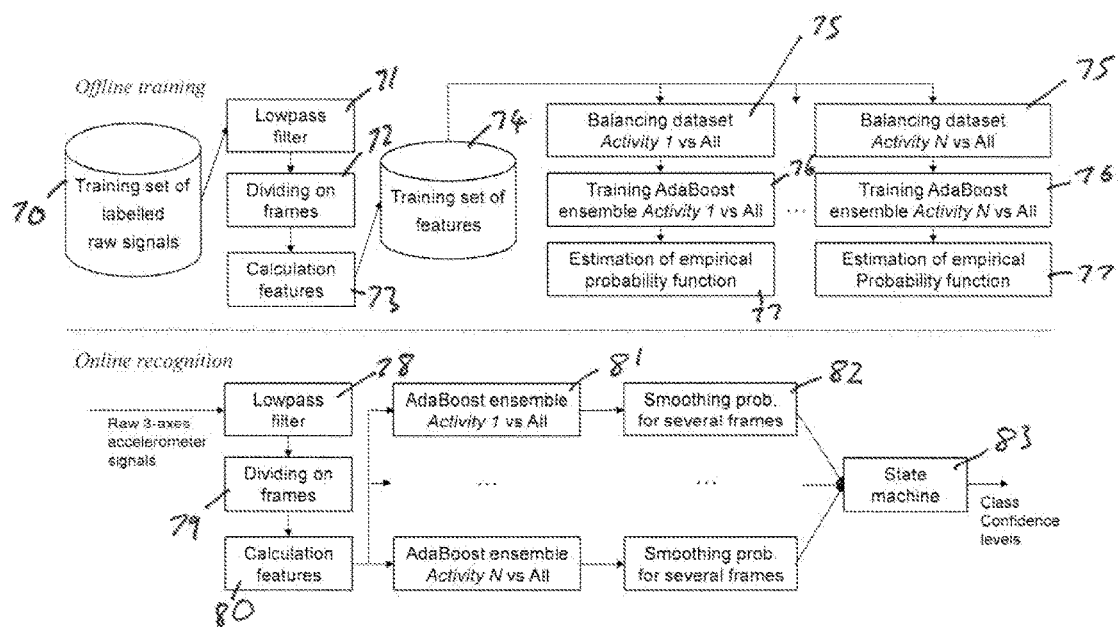
FIG. 7 illustrates a method.

Any suitable methods may be used to recognise a context, activity or gesture using the data obtained by the sensor devices 33. FIG. 7 illustrates a method which may be used to recognise activity of a user 32 based on data obtained from a three-axis accelerometer.

The example method of FIG. 7 comprises offline training and online recognition to enable supervised machine learning. The offline training may comprise a training stage during which classifier parameters are adjusted. In the example of FIG. 7 the offline training stage comprises, gathering data from a three axis accelerometer from observed subjects performing various activities. The data obtained can be identified manually either while the data is obtained or after the data has been gathered. This provides a training set of labelled data signals. As an example the signals from the three axis accelerometer may be sampled at a rate between 20 to 40 Hz. The training set of data signals may then be stored at block 70.

At block 71 the training set of data signals are passed though a low pass filter. This may suppress high frequency noise. As an example the filter may comprise a finite response filter with convolution kernel [1 1 1 1 0 0 0].

At bock 72 the filtered signals are dividing into frames to enable the signals to be analyzed for the identification of features. Each of the x, y, z channels of the three axis accelerometer may be divided into a plurality of frames. An example frame size could be between 3 and 30 seconds. The frames may overlapped or non-overlapped. Each of the plurality of frames may be analyzed for the identification of features.

At block 73 the frames are analyzed to identify features in the obtained signals. The features may be calculated in the time domain or the frequency domain.

In the time domain features may be derived from values such as:

Magnitude of signal: $s_i = \sqrt{x_i^2 + y_i^2 + z_i^2}$

Mean: $\bar{s} = \frac{1}{n}\sum_{i=1}^{n} s_i$, where $n$ is number of samples in frame, $x$, $y$ and $z$ are channels of 3-axes accelerometer Variance: $\sigma^2 = \frac{1}{n}\sum_{i=1}^{n} (s_i - \text{mean})^2$ Average absolute difference: $D = \frac{1}{n}\sum_{i=1}^{n} |s_i - \text{mean}|$, Mean crossing rate $= \frac{1}{n-1}\sum_{i=1}^{n-1} CR(s_i, s_{i+1})$, where $CR(a, b) = \begin{cases} 1: & a \times b < 0 \\ 0: & \text{otherwise.} \end{cases}$ Also features may be identified from quintiles Q10, Q25, Q50, Q75, Q90 and interquartile difference IQD=Q75−Q25 which may be calculated for magnitudes. Signal Magnitude Area (SMA) may be calculated from x, y and z channels as:

$$sma = \frac{1}{n}\sum_{i=1}^{n} (|x_i| + |y_i| + |z_i|).$$

A Fast Fourier Transform (FFT) may be applied to transform the signal to the frequency domain. In the frequency domain energy, entropy and peak position may be calculated for various portions of the spectrum or sub bands or the spectrum.

Features may be identified for all of the signals in the training set of signals. At block 74 the identified features may be stored as a training set of features. Each of the training set of features may be stored with a corresponding identifying signal.

In order to enable the system to be used to identify a plurality of activities a multiclass classification system may be used at block 75. In the example of FIG. 7 N activities are classified by means of N binary classifiers. Each of the classes within each of the binary classifiers has label 1 or −1 where one class represents activity i and the other class represents all other activities.

In some examples a gentle adaptive boosting (Adaboost) technique may be used at block 76, to create the binary classifier. Such techniques may provide a training classifier with good recognition quality and low computational complexity. Adaboost creates a classifier as a weighted sum of binary decision trees which is an ensemble of simpler classifiers. Each node of the binary decision trees contains a comparison of a feature with a threshold. The number of trees, topology of the trees, thresholds and weights are adjusted during the offline training. A value of weighted sum of binary decision trees is used for inference making.

In some examples it may be preferable to provide a balanced data set in which there are approximately the same number of instances in each class. In order to balance the data set, instances of a minor class may be repeated.

At block 77 the empirical probability function is estimated for a given classifier. The empirical probability function may be estimated by classifying all instances from a balanced training set and calculating the percentage of positively classified instances from weighted sums. The empirical probability function allows the probability of an output to be calculated and gives an indication of the level of confidence that the output is correctly identified.

The online recognition may be performed in real time by the sensor devices 33. The raw three-axis accelerometer data signals are obtained. The data signals may be sampled at the same rate at which the training signals were sampled.

At block 78 the data signals are passed though a low pass filter. The low pass filter may be the same as the filter used on the training signals. At block 79 the filtered signals are divided into a plurality of frames and at block 80 the frames are analyzed to identify features. The same methods and techniques may be used to divide the signals into frames and identify features as is used on the training signals.

At block 81 the identified features are input into N Adaboost ensembles. Each of the ensembles gives a weighted sum as an output which can then be transformed to an empirical probability.

At block 82 the probabilities are smoothed for several consecutive frames in order to provide a more stable and reliable classification. At block 83 the smoothed probabilities are transferred to a state machine such as a finite state machine (FSM). Each of the states of the FSM may correspond to an activity. The initial state is "unknown". The dominant activity is detected by a comparison of smoothed probabilities for all activities. The state will then be changed to correspond to the identified dominant activity. The identified state may be changed to correspond to a different activity when the current state does not correspond to the dominant activity for a period of time. If the same activity is dominant for the period of time then the state will be changed to correspond to the new dominant activity. If different activities are dominant for the period of time then the state will be changed to "unknown". The confidence levels for the FSM may be normalized smoothed probabilities for each class.

The above described methods may be used to enable activities of a user 32 to be identified. Other examples may be used to enable context or gestures to be recognised. For instance, context recognition may be implemented by using location detection and a comparison with predefined places such as gym, swimming pool, park or other location. In some examples the detected coordinates may be compared with locations provided by a content provider.

In other examples audio recognition may be used to enable context recognition. In such examples one or more of the sensor devices 33 may comprise a microphone which may be configured to detect ambient sound. Methods such as the method of FIG. 7 may be used to enable audio based context recognition.

In other examples image recognition may be used to enable context recognition. In such examples one or more of the sensor devices 33 may comprise an image capturing device. The processing circuitry 5 may then be configured to analyse images obtained by the image capturing device. Methods such as the method of FIG. 7 may be used to enable image based context recognition.

Methods such as the method of FIG. 7 may also be used to enable recognition of gestures. In some examples an accelerometer such as MEMS (microelectromechanical system), a gyroscope, a magnetometer or other suitable means or combination of means may provide the source data. The accelerometer may be located in a sensor device 33 which is attached to the parts of the body of the user 32 which are moved to make the gesture.

It is to be appreciated that a combination of methods may be used to enable context and/or activity and/or gesture to be recognised.

Figure 8:
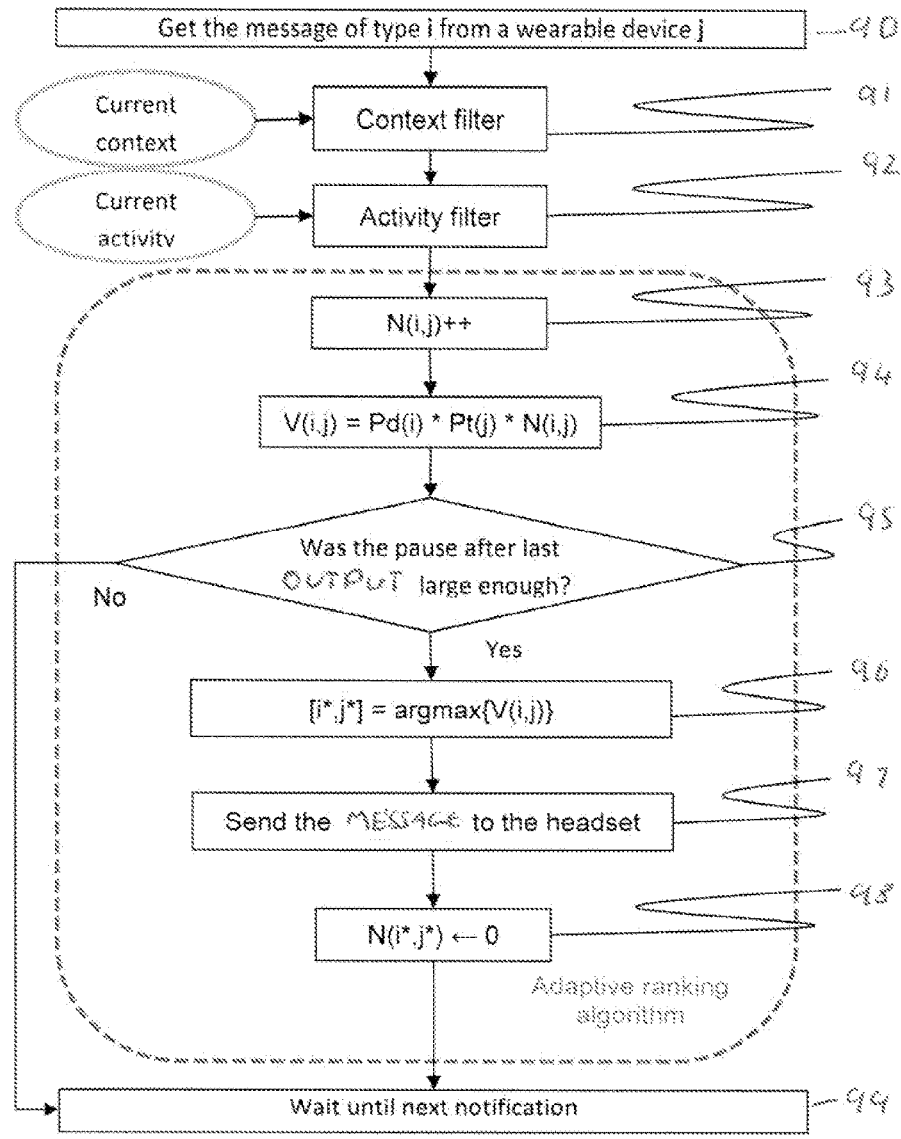
FIG. 8 illustrates a method.

FIG. 8 illustrates a method which may be performed by the electronic device 21 when a message 19 is received. The method may enable messages 19 to be selected to be provided to a user so that only the most relevant information is provided to the user.

As described above the information which is obtained by the electronic device 21 may comprise information which is obtained in notifications 18 and information which is obtained in messages 19. At block 90 a message 19 is obtained by the electronic device 21 from a sensor device 33. In the example of FIG. 8 the sensor device 33 is a wearable device which may be attached to the body of the user 32. In other examples a sensor device 33 which is not worn by the user 32 may be used.

At block 91 the message 19 is analysed to determine whether or not the information obtained in the message 19 is relevant to the current context of the user. The context of the user may be identified using information which has been obtained in notifications. Therefore the information which is obtained in notifications is used to filter and select the information obtained in messages 19 which is to be provided to a user 32.

The analysis may be performed by applying an adjustable set of rules in which a set of contexts are associated with a set of types of message 19 and a set of sensor devices 33. For each context it may be determined that a type of message 19 from a type of sensor device 33 may or may not be of interest to the user 32.

At block 92 the message 19 is analysed to determine whether or not the information obtained in the message 19 is relevant to the current activity of the user 32. The activity of the user 32 may be identified using information which has been obtained in notifications 18 so that the information which is obtained in notifications 18 is used to filter and select the information obtained in messages 19 which is to be provided to a user 32.

The analysis may be performed by applying an adjustable set of rules in which a set of activities are associated with a set of types of message 19 and a set of sensor devices 33. For each activity it may be determined that a type of message 19 from a type of sensor device 33 may or may not be of interest to the user 32.

An adaptive ranking algorithm may then be used on the messages 19 which are determined to be of interest for the user 32 in their current context and/or activity.

Blocks 93 to 98 represent an example adaptive ranking algorithm. It is to be appreciated that other methods could be used in other examples of the disclosure.

In the example method of FIG. 8:

Pd(i) represents priority of a sensor device i;

Pt(j) represents priority of a notification of type j;

N(i,j) represents quantity of a type of messages from a given sensor device;

V(i,j) represents a value of a type of message from a given sensor device. The value V indicates the likelihood that the user will be interested in the message 19.

i*, j* represents indexes of message of type j from device i, which are selected to be sent to the user;

At block 93, N(i,j) is incremented due to the receipt of the new message 19. At block 94 the value V for the new message 19 is calculated.

At block 95 it is determined whether or not enough time has elapsed since the last message 19 was provided to the user 32. In the particular example of FIG. 8 it is determined whether or not the pause after the last output to the user 32 was large enough. This may prevent too many messages 19 from being provided to the user 32 within a given period of time.

The duration of the pause or time period may be an adjustable parameter. The user 32 may be able to make user inputs to adjust the pause or time period. The user may be able to use the user input device 25 of the electronic device 21 to control the time period or pause. In other examples the electronic device 21 may be configured to recognize gestures made by the user and modify the frequency of messages 19 in response. The information indicative of the gesture may be obtained in one or more notifications 18. This may enable information obtained in notifications 18 to be used in an adaptive ranking algorithm.

If the delay since last output is large enough then at block 96, the most relevant message 19 to be provided to the user 32 is selected. In the example of FIG. 8 the most relevant message 19 is selected depending on maximum value of V(i,j) for each type of messages 19.

At block 97 the selected message 19 is sent to the headset 36 to enable the message to be provided to the user 32. After the selected message 19 has been sent to the headset 32 the quantity of messages 19 of selected type is set to zero at block 98.

The coefficients Pd(i) and Pt(i) may be adjusted during in real time by analyzing feedback from the user 32 indicating the relevance of the selected message 19.

It is to be appreciated that other methods may be used to select the messages 19 to be provided to the user in other examples of the disclosure.

Figure 9:
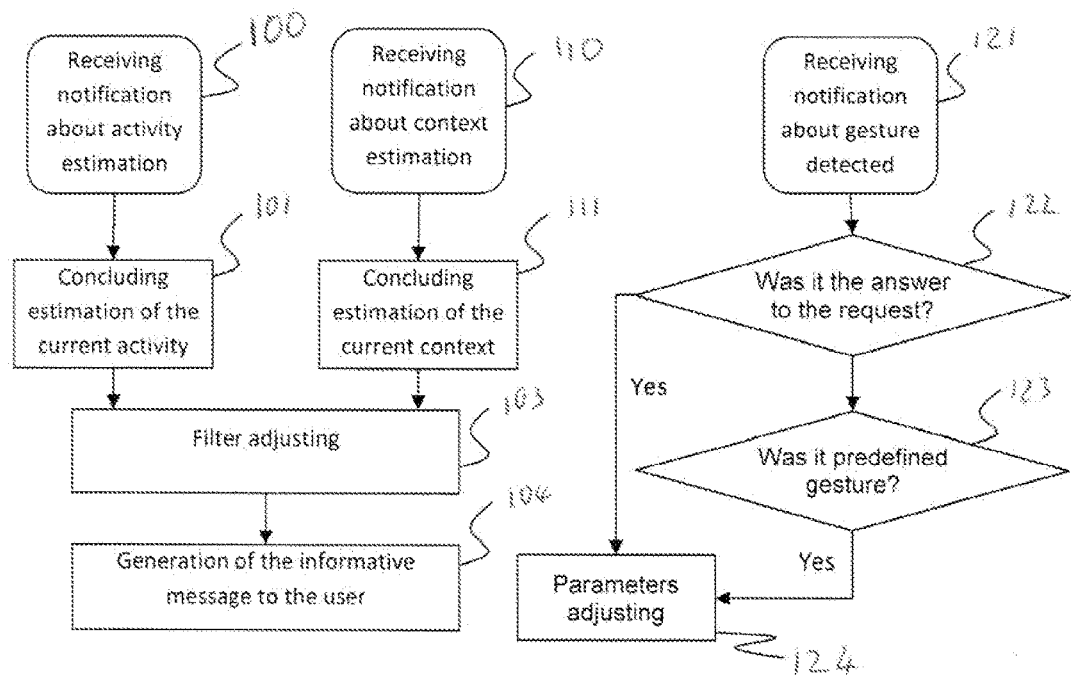
FIG. 9 illustrates a method.

FIG. 9 illustrates a method. The method may be performed by an electronic device 21 as described above acting as a sensor hub 34. The example method of FIG. 9 may be performed when the electronic device receives a new notification 18.

The electronic device 21 may be configured to obtain notifications 18 relating to activity of a user 32 a context of a user 32 or a gesture which the user has made. The notifications 18 may be obtained from one or more sensor devices 33.

At block 100 the electronic device 21 obtains a notification 18 relating to an activity of a user 32. The notifications 18 may indicate that a new activity has been detected. In some examples the notifications 18 may indicate that the confidence level for last detected activity has been changed.

After obtaining the notification 18 relating to an activity of a user 32, at block 101, the electronic device 21 may use the obtained notification to re-estimate the current activity of the user 32.

If, at block 101 it is in concluded that the activity of the user 32 has changed then, at block 103 the filter for incoming messages 19 is adjusted to take this into account.

At block 110 the electronic device 21 obtains a notification 18 relating to a context of a user 32. The notifications 18 may indicate that a new context has been detected. In some examples the notifications 18 may indicate that the confidence level for last detected context has been changed.

After obtaining the notification 18 relating to the context of a user 32, at block 111, the electronic device 21 may use the obtained notification to re-estimate the current context of the user 32.

If, at block 111 it is in concluded that the context of the user 32 has changed then, at block 103 the filter for incoming messages 19 is adjusted to take this into account.

At block 104 an informative message for the user 32 may be generated. The informative message may relate to the change of context and/or activity. In some examples the informative message may comprise an indication of the new context and/or activity. In some examples the informative message could comprise a summary or statistical information relating to the context and/or activity that has been completed. For instance the information may comprise the number of calories burned after finishing exercises, the distance traveled after finishing cycling, time elapsed after coming to a workplace or any other suitable information.

This enables the information which is obtained in the notifications 18 to be used to select which of the information in messages 19 is to be provided to a user 32.

At block 121 the electronic device 21 obtains a notification 18 relating to a detected gesture. The gesture may be a known or pre-determined gesture.

At block 122 it is determined whether or not the gesture was in response to a request. The request may have been generated by the electronic device 21. The request may have been a request to a user 32 to confirm that a context and/or activity has been estimated correctly. In some examples the request may comprise a request to the user 32 to indicate the frequency that they would like to receive messages 19 or any other suitable request.

At block 123 it is determined whether or not the gesture was a predefined gesture. The predefined gesture may be a gesture which indicates that the user is not interested in certain types of messages 19 or in messages 19 obtained from a particular sensor device 33. In some examples the gesture may indicate that the user would like to change the frequency at which they are receiving certain types of messages 19 or messages 19 obtained from a particular sensor device 33.

If the gesture was the answer to a request or a pre-defined gesture then at block 124 the parameters of the adaptive ranking algorithm are adjusted. This enables the information which is obtained in the notifications 18 to be used to select which messages 19 are to be provided to a user 32.

Figure 10:
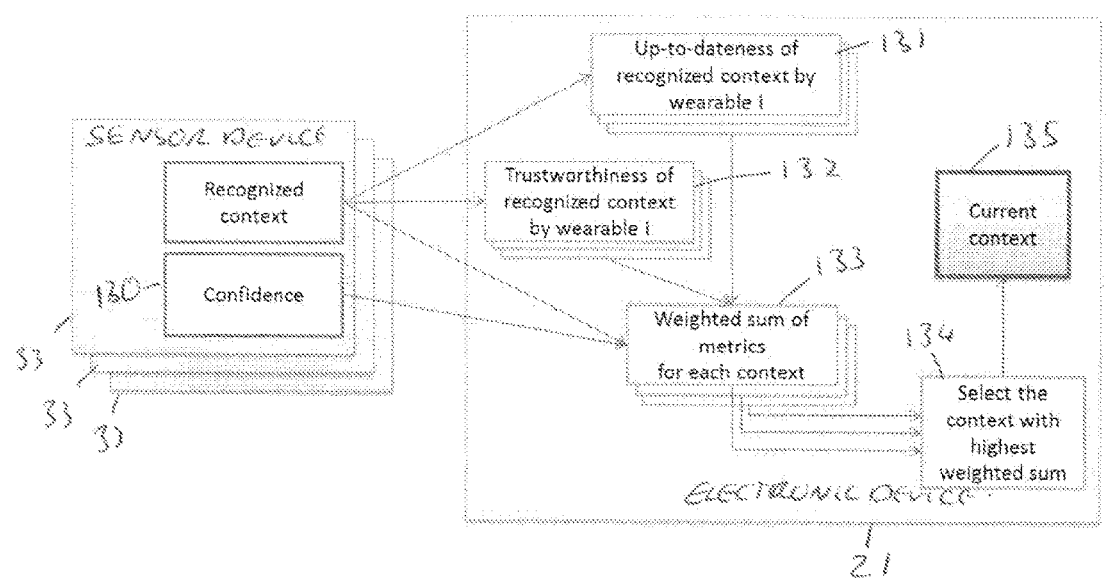
FIG. 10 illustrates a method for context recognition.

FIG. 10 illustrates a method for context recognition which may be performed by an electronic device 21 in examples of the disclosure.

In the example of FIG. 10 a plurality of sensor devices 33 provide notifications 18 indicative of a recognized context to the electronic device 21. The sensor devices 33 may also provide an indication of the confidence level in that recognized context. The confidence level may comprise an indication of the probability that the context has been recognized correctly.

The electronic device 21 may be configured to obtain notifications 18 indicative of a recognized context from the plurality of sensor devices 33 and use the information to determine an aggregate context. FIG. 10 shows an example which may be used to determine an aggregate context. In the example of FIG. 10 a plurality of normalized metrics are associated with individual contexts. In some examples the metrics may be provided by the sensor devices 33. In some examples some of the metrics may be calculated by the electronic device 21.

One of the metrics may be the confidence level which may be provided by the sensor device 33 or calculated by the electronic device 21. This may be calculated at block 130. In the example of FIG. 10 the confidence level may be either provided by the sensor device 33 or set to a value of 1.

A second metric may be the currentness of the recognized context. This may be calculated at block 131. This may give an indication of how up to date the recognized context is. This metric may quantify the temporal utility of the recognized context.

In some examples the currentness metric may be determined by calculating the histogram $f_{\Delta T}^i(\Delta t)$ of the time interval between two consecutive context recognition results for each sensor device 33.

The currentness metric is calculated as $$\text{Currentness} = \max\left(0, \left(1 - \frac{\text{Age}}{T}\right) F(\text{Age})\right),$$

where Age is the difference between the current time and the time when the context was recognized, $F(\text{Age}) = P[\Delta T > \text{Age}] = 1 - \int_0^{Age} f_{\Delta T}^i(\Delta t) d\Delta t$ is the empirical probability of not receiving the next context recognition result from sensor device i at current time and T is maximum period of expected time that the recognized context could be considered valid.

A third metric may be the trustworthiness. This may be calculated at block 132. The trustworthiness metric represents the probability that the information provided by a given sensor device 33 is correct. In some examples trustworthiness of a sensor device 33 may be statically set so that the trustworthiness does not change. In such examples the trustworthiness may be inversely proportional to the number of contexts that the sensor device 33 is able to recognize. In some examples the trustworthiness may be set according to user preferences.

In some examples trustworthiness can also be dynamically updated by an electronic device as result of monitoring of context recognition results. For example if it is determined that a sensor device 33 often switches between contradictory contexts, or the output of the sensor device 33 differs significantly from the majority of other sensor devices 33 then the trustworthiness of the sensor device 33 may be decreased.

Each context recognition may be valid if Age<T. For each valid context recognition result the electronic device 21 maintains, at block 133, a weighted sum of the above metrics.

weighted sum=$w_1$Confidence+$w_2$Uptodateness+ $w_3$Trustworthiness

The context with highest aggregated metric is selected, at block 134, as the most probable context and is set as the current context at block 135.

The method of FIG. 10 shows how a context may be determined. It is to be appreciated that a similar method may be used to determine an activity. In some examples the activities may be organized into a hierarchy so that an activity with a lowest hierarchy level can be chosen as the activity from the possible available activities.

The apparatus 1, methods and computer programs described above provide for a system 31 which enables information to be provided to a user 32. The system 31 can use information generated by the sensor devices 33 to determine which messages 19 are currently most relevant to the user 32. This means that only the most relevant information needs to be provided to the headset 36 and subsequently the user 32.

This provides many advantages. It reduces the number of messages which have to be transmitted between the electronic device 21 and the headset 36. It may also reduce the number of messages which are output by the headset 36. This may provide a more efficient system.

As the number of messages which are provided to the user 32 is reduced this may prevent the user 32 from being presented with a overwhelming amount of information. The system also enables a user 32 to control the frequency at which they receive the messages so that the system can be adapted for the personal preferences of the user 32.

The system also enables the information to be provided in real time. As only the most relevant information is provided to the user it is possible for the user to receive this information while performing an activity. The information which is not selected to be provided to the user may be stored in the memory circuitry 7. Such information may be accessed by the user 32 after they have completed the activity if they wish to.

In the examples described above the information is provided as an audio output. This may enable the information to be provided to the user without distracting the user from the tasks which they are carrying out.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one." or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
processing circuitry; and
memory circuitry including computer program code;
the memory circuitry and the computer program code configured to, with the processing circuitry, cause the apparatus at least to perform:
obtaining information from a plurality of sensor devices wherein a first type of information is obtained in notifications and a second type of information is obtained in messages;
determining, from the notifications, at least one of a context of a user, an activity of a user, or a gesture of a user;
determining, based at least in part on the determined context, activity, or gesture and using information obtained in notifications, which information obtained in messages is selected to be provided to a user, wherein the information obtained in the notifications is used in an adaptive ranking algorithm of the information obtained in the messages; and
enabling the selected information obtained in messages to be provided to a user.

2. An apparatus of claim 1 wherein the information obtained in notifications is used to filter the information obtained in messages.

3. An apparatus of claim 1 wherein the information obtained in messages comprises information indicative of at least one of a physiological parameter, an environmental parameter, a location, or movement of a sensor device.

4. An apparatus of claim 1 wherein the selected information is provided to a user while the user is performing an activity.

5. An apparatus of claim 1 wherein the selected information is provided to a user in real time.

6. An apparatus of claim 1 wherein the plurality of sensor devices comprise at least one wearable sensor device.

7. An apparatus of claim 1 wherein the information is obtained via short range communication links.

8. An apparatus of claim 1 wherein the apparatus is configured to generate a request to a user to enable a user to confirm information.

9. An apparatus of claim 1, wherein the apparatus is further caused to:
assign a priority to the messages, where the priority is based on the determined context of the user, activity of the user, or gesture of the user.

10. An apparatus of claim 9, wherein the apparatus is further caused to:
enable the selected information obtained in messages of a higher priority to be provided to the user at a higher frequency than messages of a lower priority.

11. An apparatus of claim 1, wherein a context of a user and an activity of a user are determined from the notification, wherein determining, based at least in part on the determined context and activity, which information obtained in messages is selected to be provided to a user comprises filtering the messages according to a context filter and according to an activity filter.

12. A method comprising:
obtaining information from a plurality of sensor devices wherein a first type of information is obtained in notifications and a second type of information is obtained in messages;
determining, from the notifications, at least one of a context of a user, an activity of a user, or a gesture of a user;
determining, based at least in part on the determined context, activity, or gesture and using information obtained in notifications, which information obtained in messages is selected to be provided to a user, wherein the information obtained in the notifications is used in an adaptive ranking algorithm of the information obtained in the messages; and
enabling the selected information obtained in messages to be provided to a user.

13. A method of claim 12 wherein the information obtained in notifications is used to filter the information in the messages.

14. A method of claim 12 wherein the information obtained in messages comprises information indicative of at least one of a physiological parameter, an environmental parameter, a location, or movement of a sensor device.

15. A method of claim 12 wherein the selected information is provided to a user while the user is performing an activity.

16. A method of claim 12 wherein the selected information is provided to a user in real time.

17. A method of claim 12 wherein the plurality of sensor devices comprise at least one wearable sensor device.

18. A method of claim 12 wherein the information is obtained via short range communication links.

19. A method of claim 12 further comprising generating a request to a user to enable a user to confirm information.

* * * * *